May 25, 1954     W. L. MORRISON     2,679,114
APPARATUS AND METHOD OF DIGESTING
AND COMPOSTING ANIMAL MANURE

Filed April 13, 1951     3 Sheets-Sheet 1

INVENTOR.
Willard L. Morrison
BY Parker & Carter
Attorneys.

May 25, 1954

W. L. MORRISON
APPARATUS AND METHOD OF DIGESTING
AND COMPOSTING ANIMAL MANURE 2,679,114

Filed April 13, 1951

INVENTOR.
Willard L. Morrison
BY Parker & Carter
Attorneys

May 25, 1954   W. L. MORRISON   2,679,114
APPARATUS AND METHOD OF DIGESTING
AND COMPOSTING ANIMAL MANURE
Filed April 13, 1951   3 Sheets-Sheet 3

INVENTOR.
Willard L. Morrison
BY Parker & Carter
Attorneys

Patented May 25, 1954

2,679,114

UNITED STATES PATENT OFFICE 2,679,114

APPARATUS AND METHOD OF DIGESTING AND COMPOSTING ANIMAL MANURE

Willard L. Morrison, Lake Forest, Ill., assignor to Union Stock Yards & Transit Company, Chicago, Ill., a corporation of Illinois Application April 13, 1951, Serial No. 220,895

4 Claims. (Cl. 34—83)

My invention relates to improvements in apparatus for and the method of composting or digesting animal manure and the like. It has for one object to provide a system whereby large quantities of animal manure may be continuously digested at low expense and with a minimum of offensive odors and the like.

Other objects will appear from time to time throughout the specification and claims.

In general, I propose to form a large mass of raw manure, pass air the temperature and moisture content of which is accurately controlled continuously through the mass, recirculating the air but at the same time removing some of the air and replacing it with fresh ambient air in consonance with the digestion process and wherein digested or composted manure will be continuously withdrawn from the mass while raw manure is continuously supplied to the mass.

My invention is illustrated more or less diagrammatically in the accompanying drawings, wherein.

Like parts are indicated by like characters throughout the specification and drawings.

Figure 1:
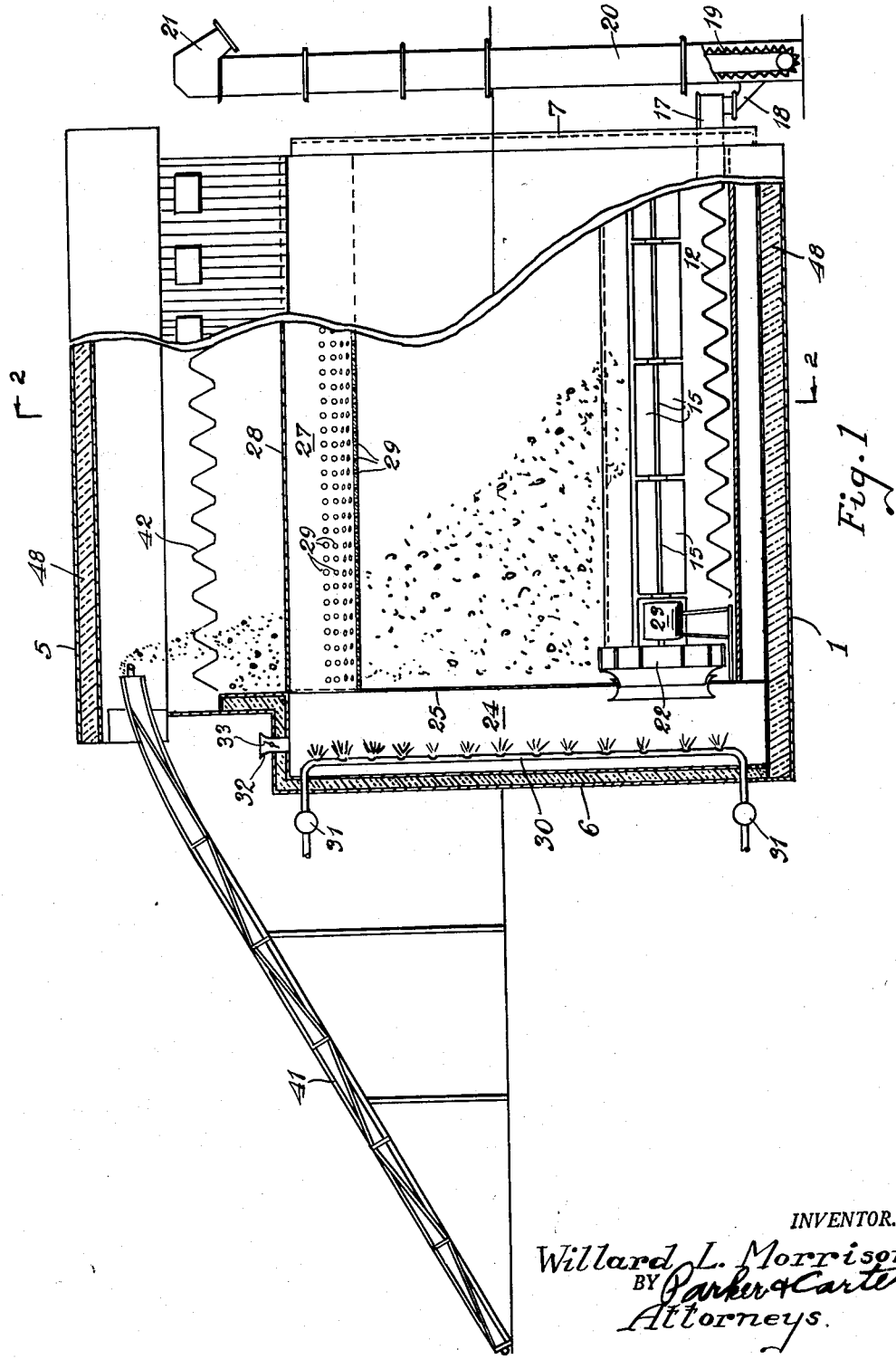
Figure 1 is a part section, part side elevation of the apparatus adapted to carry out my invention.

This apparatus includes a concrete floor 1, concrete vertical walls 2, upwardly and inwardly inclined concrete walls 3, a vertical clerestory 4 and a roof 5, defining with suitable end walls 6 and 7, a composting chamber. The chamber is provided above the floor 1 with a louvered floor which in the example shown takes the form of a plurality of longitudinal concrete beams 8, each having a louvre defining lip 9, the lips overlapping to provide a louvred floor through which air may pass but through which manure will not be likely to pass. As indicated the beams 8 and louvres 9 define two inwardly and downwardly inclined floors extending from the upper boundaries of the walls 2, downwardly to longitudinal vertical walls 10. Between the walls 10 below the open mouth between the two downwardly inclined floors is a chute or trough 11 defining a discharge chamber containing a screw conveyor 12. Above the screw conveyor are a pair of vane shafts 13, 14 having vanes 15 projecting therefrom. Immediately above the vane shafts is a roof-like deflector member 16. Means are provided to rotate the shaft 13 in a clockwise direction, the shaft 14 in a counterclockwise direction so that manure passing downwardly through the space between the louvred floors will be fed at a controlled rate to the chute 11 and to the screw conveyor 12. The screw conveyor discharges into a tunnel 17 always completely filled with processed manure which tunnel discharges into a chute 18 to a conveyor 19 in the boot 20 for discharge through a suitable chute 21.

The floor 1, the walls 2 and 10 and the louvred floors define together two plenum chambers into which air under pressure is forced by the blowers 22 driven by motors 23. The blowers draw air from a duct 24 bounded by the walls 6 and 25, force the air into the plenum chambers 26, thence through the louvred floors into the mass of manure supported on the floors. The air passes upwardly through the mass of manure to the plenum chamber 27 defined by a pipe 28, the pipe being closed on the upper half of its circumference but perforate as at 29 on the lower half of its circumference. Hot water and steam may be sprayed by any suitable means not here illustrated through the pipe 30 into the duct 24 to control the moisture content and the temperature of the air forced through the composting mass. Any suitable means such as diagrammatically indicated as valves 31 may be used to control the flow of steam or water to the pipe 30. 32 is an air inlet port adapted to be controlled by a butterfly valve 33 to control the inflow of ambient air into the duct 24.

Figure 3:
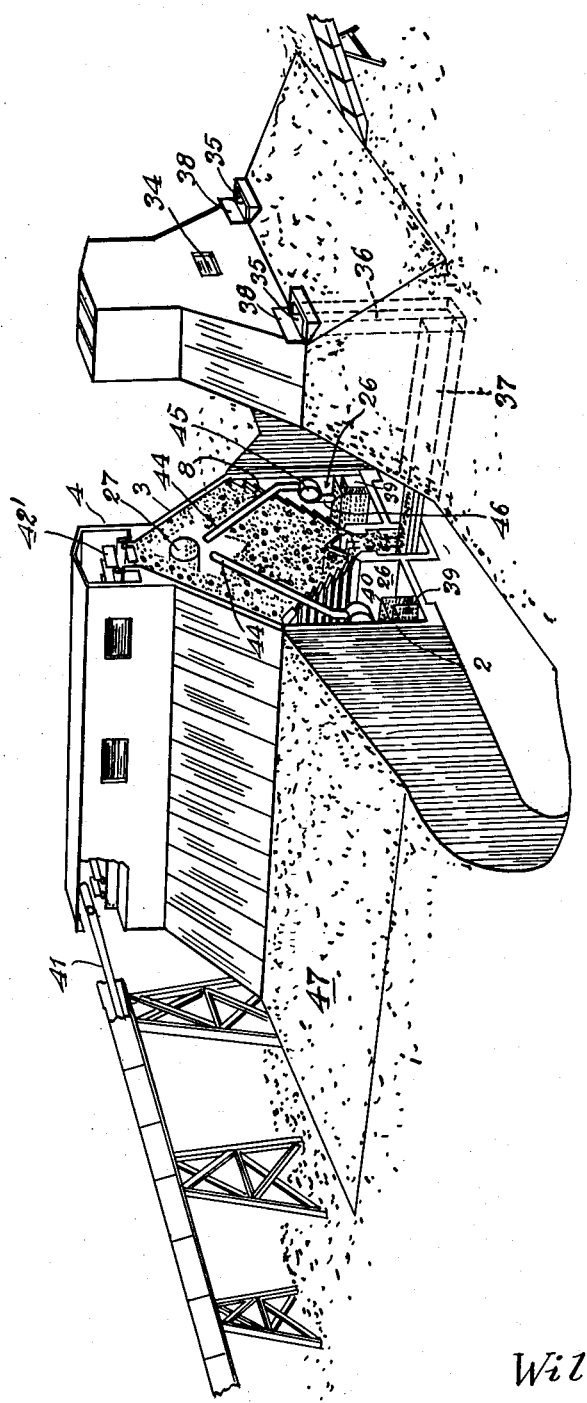
Figure 3 is a perspective view of the plant showing certain modifications with parts in section and parts omitted for clarity.

The blowers 22 may discharge directly into the plenum chambers 26 but in Figure 3 is illustrated a pair of ducts within the plenum chambers, one duct 39 within the outer duct 40, the ducts having perforate walls as indicated, the perforations being different in the two ducts so as to insure a continuous, even distribution of air under pressure into the entire length of the plenum chambers 26. Air passes from the plenum chamber 26 through the mass of manure into the plenum chamber 27, thus into the duct 24 so that there is a continuous circulation of air from duct 24, fan 22, plenum chamber 26, past the louvres 9 through the mass of manure to plenum chamber 27 back to the duct 24.

41 is a conveyor. It discharges into the clerestory at one end and the manure falls freely past the plenum chamber 27 down to the louvred floors and fills the chamber at one end until the level of manure at the end reaches the level of the screw 42. Up to that point the manure in the composting chamber will be concentrated at one end extending only as far forward on the louvred floor as is dependent on the angle of repose of the manure. As soon as the pile reaches the height of the conveyors 42 however, the pile forms its own trough about the conveyor 42 and the composting chamber will be gradually filled clear to the discharge end. The conveyor 42 being driven in unison with the feed and in unison with the rate of discharge by the screw conveyor 12 provides a continuous flow of raw manure fed by the conveyor 41. Raw manure will then be fed to the top of the pile at the same rate as composted manure is discharged from the bottom of the floor. The level of the manure is indicated at 43 in the clerestory.

The motors to drive the vane shafts 13 and 14, the screw conveyors 12 and 42 and the other conveying mechanism are not illustrated since they form no part of my present invention, being merely standard, conventional motors with the usual controls.

Figure 2:
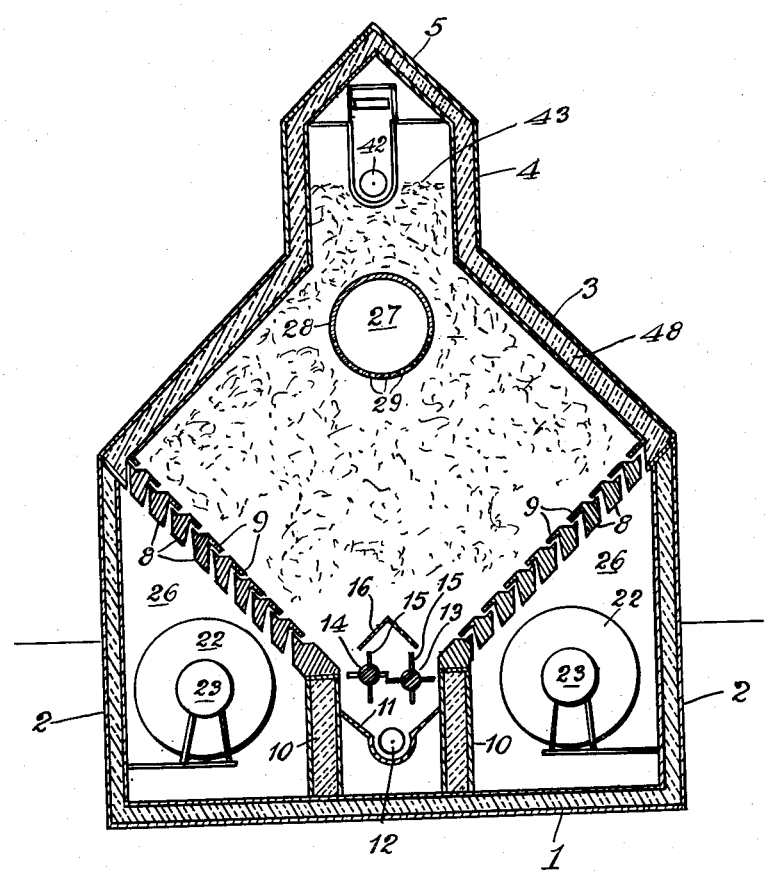
Figure 2 is a section along the line 2—2 of Figure 1.

In Figure 3, a modification is shown taking the form of pipes or ducts 44 which lead from near the plenum chamber 27 down through the mass of manure through the louvred floor to fans 45 to discharge through ducts 46 to the inside of the duct 39. The purpose of these ducts 44 is to provide additional means for withdrawal of gas from the mass of manure because adjacent the plenum chamber 27 the manure will be in an early stage of digestion and offer substantial resistance to air flow, the fans 45 being in addition to fans such as the blowers 22 of Figures 1 and 2 which are not shown in Figure 3. The operation, of course, is exactly the same in both cases. I have shown a flight conveyor 42' and in this figure it is a substitute for the screw conveyor 42 in Figure 1. The conveyors operate in the same way. As the level of the manure builds up the conveyor carries material further on but material brought by the flight conveyor to the point where the manure is not built up will be deposited at that point to build it up. In the modified form shown in Figure 3, the air intake port is shown in the wall of the building as at 34, in register with low pressure chamber 27. In Figure 3 is also shown air exhaust ports 35 associated with ducts 37, 37 communicating with the high pressure plenum chambers 26 to permit discharge of air and gas from the system as desired. Flaps 38 may be adjusted in position to control the rate of discharge of air or gas from the system.

Since control of temperature is of the utmost importance in composting, I have illustrated my invention as being partially underground with the dirt of the excavation piled as indicated at 47 along the walls 2. These walls, together with the walls 3, and the clerestory 4 are insulated also as indicated at 48 and since the level of the manure in the clerestory extends substantially above the plenum chamber 27, that chamber like the other plenum chambers is also insulated, in this case by the raw manure. Digestion or composting will take place in the area between the louvred floor and the plenum chamber 27, that is, within the area through which air is continuously and positively forced to travel through the manure mass. The raw manure above plenum chamber 27 tends to provide a rather effective air seal, not as effective to be sure as the mass of manure forced under pressure along the tunnel 17 but nevertheless a seal which to some extent at least limits the escape of air under pressure. Any air that does pass upwardly through this manure seal, will to some extent promote some measure of composting before the raw manure reaches the real composting zone.

By this arrangement, there can be, therefore, a continuous supply of raw manure throughout the whole length of an elongated composting zone or chamber because whenever there is any falling of the level of the manure area from the conveyor 42, the manure being conveyed from the discharge of the conveyor 41 will be carried by the conveyor 42 to the point where the level has been reduced and manure will there be deposited until the level has been re-establishd.

The composted manure will be discharged from the bottom of the pile. The rate of discharge being controlled by the vanes 13, 14 to insure an even distribution of manure to the screw conveyor 12. Since the vanes are continuous, withdrawal of manure from the bottom of the pile will be continuous along the entire length of the pile. The composted manure will gravitate toward the vane shafts and since the angle of the louvred floor is such that material will flow along it, the composted manure will gradually travel down with the mass, being withdrawn in finished condition from the bottom of the mass while being continuously replaced with raw manure at the top.

The operation of the vane blades limits the rate of discharge of composted manure to the screw conveyor and to insure that this limited discharge will take place throughout the entire length of the composting chamber at a rate such that the screw conveyor will not be overloaded. The inclination of the louvred floor in each case is sharp enough so that it exceeds the angle of repose of the raw and composted material so that there is a constant pressure of composted manure as it travels downwardly through the mass along the floor or toward the discharge so that there is a continuous flow of material through the mass, the composted material being discharged continously and being continuously replaced by raw manure from above during the operation of the mechanical elements of the apparatus.

The mass of composting manure is insulated against substantial heat loss. Heat is generated by the composting process in the mass. Most of the air circulating through the manure is continuously recirculated so that heat of that air is not wasted. If the moisture content of the air is too low to promote digestion, air may be moisted as indicated. As deleterious gases, such as carbon dioxide, or others are generated in the process, their concentration may be limited by controlling the discharge of gas from the system and the supply of ambient air to it.

The composting process itself raises the temperature of the mass and can very easily raise the temperature to a point above the optimum for composting. Air may be drawn in as above indicated from the outside to keep the temperature from rising too high. Since the composting temperature is far above any ordinary ambient air condition, under ordinary circumstances mere addition of air is sufficient and in many conditions the problem will be to keep the heat high. Under these circumstances hot air instead of steam could be introduced through the pipe 30 or by any other suitable means though usually steam will itself be sufficient to raise the temperature to the desired point and has the double advantage of providing an easy way in which any additional moisture may be introduced. If moisture is excessive then hot air instead of steam can be supplied.

There is always some escape of air above the plenum chamber through the clerestory. Windows are provided there or any other suitable ventilation means, to assist in controlling the temperature and the ducts 35 may be controlled manually or automatically by manipulation of the flaps 38 and thus there is a controlled admission and a controlled discharge of gas and air from the system.

I claim:

1. Means for composting animal manure including an insulating housing, plenum chambers extending longitudinally of the housing, a longitudinal open top discharge chamber between the plenum chambers, inwardly and downwardly inclined air pervious floors extending between the outer walls of the housing and the walls of the discharge chamber, each floor forming a wall of one of the plenum chambers, conveyor means extending longitudinally of the discharge chamber, rotary feeder blades mounted in the open mouth of the discharge chamber above the conveyor adapted to control the rate of flow of material along the inclined air pervious walls into the discharge chamber, walls inwardly and upwardly inclined from the upper edges of the air pervious floors, a clerestory extending upwardly from the inner edges of the inclined walls to close them, an upper plenum chamber located below the clerestory and above the air pervious floors, a conveyor extending longitudinally of the clerestory, a conduit joining the upper plenum chamber and the two lower plenum chambers, means for drawing air through such conduit from the upper plenum chamber and forcing it under pressure into the lower plenum chambers, means for sealing the discharge end of the conveyor in the discharge chamber, the cross sectional area of the clerestory being substantially less than the cross sectional area of the remainder of the composting chamber, means for supplying manure to the clerestory for distribution by the conveyor therein along the entire length of the composting chamber and for maintaining the level of manure on the floor above the upper plenum chamber, means for supplying moisture and heat to the conduit joining the two plenum chambers, means for controlling the discharge of air from and the supply of air to the air recirculating system defined by the plenum chambers and the conduit.

2. Means for composting animal manure and the like comprising a chamber having two adjacent downwardly and inwardly inclined louvred walls, a movable grate-like floor between the lower boundaries of said walls, conveyor means below said floor adapted to receive and discharge material fed through the grate, high pressure chambers beneath and in communication with each of said louvred floors, a suction chamber contained within the housing above the louvred floors, teh lower wall of the suction chamber being apertured in opposition to the louvres in the floors, cover walls inclined inwardly from the upper edges of the louvred walls and a clerestory extending upwardly from the opposite upper edges of teh cover walls, a conveyor mounted for movement in the clerestory above the suction chamber, air compressing means adapted to supply air under pressure to the pressure chambers, air conduit means joining the suction chamber and the intake side of the air compressing means, the clerestory being open to the ambient air, means for admitting controlled amounts of air to the suction side of the compressors, means for controlling the moisture content and temperature of the air.

3. Means for composting animal manure and the like comprising a chamber having two adjacent downwardly and inwardly inclined louvred walls, a movable grate-like floor between the lower boundaries of said walls, conveyor means below said floor adapted to receive and discharge material fed through the grate, high pressure chambers beneath and in communication with each of said louvred floors, a suction chamber contained within the housing above the louvred floors, the lower wall of the suction chamber being apertured in opposition to the louvres in the floors, cover walls inclined inwardly from the upper edges of the louvred walls and a clerestory extending upwardly from the opposite upper edges of the cover walls, a conveyor mounted for movement in the clerestory above the suction chamber, air compressing means adapted to supply air under pressure to the pressure chambers, air conduit means joining the suction chamber and the intake side of the air compressing means, the clerestory being open to the ambient air.

4. Means for composting animal manure and the like comprising a chamber having two adjacent downwardly and inwardly inclined louvred walls, a movable grate-like floor between the lower boundaries of said walls, conveyor means below said floor adapted to receive and discharge material fed through the grate, high pressure chambers beneath and in communication with each of said louvred floors, a suction chamber contained within the housing above the louvred floors, the lower wall of the suction chamber being apertured in opposition to the louvres in the floors, cover walls inclined inwardly from the upper edges of the louvred walls and a clerestory extending upwardly from the opposite upper edges of the cover walls, a conveyor mounted for movement in the clerestory above the suction chamber.

References Cited in the file of this patent

UNITED STATES PATENTS

| Number | Name | Date |
| --- | --- | --- |
| 1,219,816 | French | Mar. 20, 1917 |
| 1,554,854 | Hubmann | Sept. 22, 1925 |
| 1,597,724 | Cooke | Aug. 31, 1926 |
| 1,669,012 | Nordstrom | May 8, 1928 |
| 1,711,574 | Miller | May 7, 1929 |
| 1,910,793 | Guinan | May 23, 1933 |
| 2,148,946 | Hubmann et al. | Feb. 28, 1939 |
| 2,410,851 | Welty | Nov. 12, 1946 |
| 2,474,833 | Eweson | July 5, 1949 |
| 2,490,097 | Seaman et al. | Dec. 6, 1949 |
| 2,522,829 | Krebser | Sept. 19, 1950 |

FOREIGN PATENTS

| Number | Country | Date |
| --- | --- | --- |
| 378,313 | Great Britain | Aug. 11, 1932 |